Patented Apr. 12, 1932

1,853,151

UNITED STATES PATENT OFFICE

JOHN B. SEGUR, OF CHICAGO, AND KENNETH H. HOOVER, OF DEERFIELD, ILLINOIS, ASSIGNORS TO ASSOCIATION OF AMERICAN SOAP & GLYCERINE PRODUCERS, INC., A CORPORATION OF DELAWARE

TREATING FRUIT

No Drawing. Application filed May 12, 1930. Serial No. 451,853.

The present invention relates to dried fruits having improved characteristics, particularly from the marketing standpoint, and to methods of producing the same.

Dried fruits, when freshly marketed, ordinarily have certain pleasing characteristics of taste, texture and appearance. Generally speaking, dried fruits such as raisins, prunes, figs, peaches and apricots are bright, substantially free from superficial saccharine deposits and are soft, pliable and tender. These characteristics of the freshly marketed dried fruits, however, are not permanent. The dried fruits undergo changes which render them less attractive in appearance and less appealing to the taste. Drying out of the fruits will occur and renders them harder and tougher. Superficial saccharine material, which may accumulate in storage on such fruits, for example, prunes, tends to cause stickiness, and furthermore, is capable of crystallization, thereby making the fruit unsightly in appearance. This crystallization may at times occur in the pulp of the fruit in varying degrees, and in other cases may actually result in bonding the fruit into a compact mass, which is broken apart with difficulty.

These undesirable changes in dried fruits may occur within relatively short periods of time, depending upon climatic and storage conditions and are, of course, commercially undesirable as they substantially reduce the value and grade of the fruit. It has accordingly become the common practice to prepare such dried fruits in form for market only in such quantities as will be disposed of within relatively short periods of time.

The treatment of fruits in accordance with the present invention improves the quality and maintains the marketability of the product. By its use it is possible to produce dried fruits which retain their pleasing characteristics of taste, texture and appearance over longer periods of time than have been possible heretofore. The treated dried fruits remain brighter and in a softer and more pliable condition than dried fruits prepared by usual means, and the crystallization of superficial saccharine material on the dried fruits is eliminated or substantially retarded.

In accordance with the present invention, it has been discovered that the application of a hygroscopic liquid coating to dried fruits overcomes largely or entirely the objectionable characteristics which develop in dried fruits as ordinarily marketed. The process need not, and ordinarily will not replace the cleaning and conditioning processes which are commonly used in the preparation of dried fruits for marketing. Rather, it is an additional treatment which will ordinarily, though not necessarily, follow the present processes and is, therefore, capable of wide application in the industry.

In the preferred embodiment of the invention, a coating of glycerol is applied superficially to the fruit, which has been prepared for marketing in the usual manner and by common practices. This application may be effected by spraying the dried fruit with glycerol or an aqueous solution containing glycerol, or by immersing the fruits in glycerol or an aqueous solution containing glycerol. The quantity of glycerol applied may vary within wide limits, but for practical purposes will ordinarily not exceed 2 or 3% of the weight of the fruit, and in general will exceed 0.25%. For example, the dried fruit, (prunes, for example) in suitable perforated trays or wire baskets or on a belt or perforated conveyor, is sprayed with about 0.75% of its weight of 95% glycerol, to produce a substantially uniform coating of glycerol thereon. Smaller fruits require a higher relative proportion and larger fruits a smaller proportion, for example, with prunes, 0.25% to 1.0% will be applied, while with raisins 0.25–1.5% will be required. A solution of glycerol in quantity to leave approximately the desired proportion of glycerol on the dried fruit may also be employed in which case subsequent drying at ordinary or moderately elevated temperatures may be advisable.

Spray application is ordinarily desirable because of its ready adaptability to either manual or mechanical operation. If desired, however, the dried fruit may be immersed in glycerol or an aqueous solution containing varying percentages of glycerol, say from 15% upwards. A 25% solution is suitable. Prolonged immersion is not required, as only superficial wetting of the surfaces of the fruit is desired. Thus when the fruits are coated by immersion, it is ordinarily sufficient to immerse them (in perforated containers or wire baskets) in the liquid and immediately remove them. In the event that a solution of glycerol has been used for their treatment the fruits may be dried in any suitable manner as by air drying at various temperatures to remove excess water and leave a thin coating of glycerol.

It has likewise been found that other hygroscopic materials of a similar physical nature may be employed, such as ethylene glycol, other glycols and the hygroscopic derivatives of glycerol and the glycols. In carrying the invention into effect the use of glycerol as hereinbefore described is preferred, since such use is legally permissible and wholly unobjectionable in foods. However, other hygroscopic liquid materials having similar characteristics may be employed where their use is unobjectionable and permissible.

Dried fruits prepared in accordance with the present invention may be packaged in the usual manner common to the trade. They have their normal pleasing characteristics of taste and texture. In addition they have a bright and attractive appearance and are soft, tender and pliable, and do not adhere or stick together. Moreover, by treating them in accordance with the present invention these desirable characteristics are retained over much longer periods of time than have been possible with dried fruits as ordinarily marketed heretofore. Dried fruits treated in accordance with the present invention are free from superficial crystalline deposits. Crystallization of superficial saccharine material such as now occurs on the surfaces of the fruit during storage in connection with marketing operations is eliminated or very greatly retarded.

We claim:

1. The method of treating a dried fruit which comprises applying superficially thereto a film consisting principally of a hygroscopic polyhydric alcohol and free from excess moisture.

2. The method of treating dried fruit which comprises applying superficially thereto a film consisting principally of glycerol and free from excess moisture.

3. The method of preparing raisins which comprises applying superficially thereto a film consisting principally of a hygroscopic polyhydric alcohol and free from excess moisture.

4. The method of preparing raisins which comprises applying superficially thereto a film consisting principally of glycerol and free from excess moisture.

5. The method of preparing raisins which comprises applying superficially thereto a film consisting principally of glycerol and free from excess moisture, the proportion of glycerol amounting to 0.25 to 1.5% on the raisins.

6. The method of treating a dry fruit which comprises applying to the surface thereof an aqueous solution of glycerol to superficially wet the surface of the fruit and drying the wetted fruit to remove excess moisture, thereby leaving on the fruit a film consisting principally of glycerol.

7. The method of preparing raisins which comprises applying to the surfaces thereof an aqueous solution of glycerol, thereby superficially wetting the raisins and drying the wetted raisins to remove excess moisture, thereby leaving a superficial film consisting principally of glycerol on the raisins.

JOHN B. SEGUR.
KENNETH H. HOOVER.